United States Patent
Jaspers et al.

(10) Patent No.: US 10,540,293 B2
(45) Date of Patent: *Jan. 21, 2020

(54) METHOD AND APPARATUS FOR AN EFFICIENT TLB LOOKUP

(71) Applicant: International Business Machines Corporation, Armonk, NY (US)

(72) Inventors: Michael Johannes Jaspers, Sindelfingen (DE); Markus Kaltenbach, Holzgerlingen (DE); Girish G. Kurup, Bangalore (IN); Ulrich Mayer, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,933

(22) Filed: Dec. 15, 2017

(65) Prior Publication Data

US 2019/0018796 A1    Jan. 17, 2019

Related U.S. Application Data

(63) Continuation of application No. 15/650,365, filed on Jul. 14, 2017.

(51) Int. Cl.
*G06F 12/10* (2016.01)
*G06F 12/1045* (2016.01)

(52) U.S. Cl.
CPC .. *G06F 12/1063* (2013.01); *G06F 2212/1016* (2013.01); *G06F 2212/681* (2013.01); *G06F 2212/684* (2013.01)

(58) Field of Classification Search
CPC combination set(s) only.
See application file for complete search history.

(56) References Cited

U.S. PATENT DOCUMENTS

| | | |
|---|---|---|
| 7,313,669 B2 | 12/2007 | Neiger et al. |
| 7,925,859 B2 | 4/2011 | Banerjee et al. |
| 8,209,488 B2 | 6/2012 | Arimilli et al. |
| 8,782,374 B2 | 7/2014 | Rappoport et al. |
| 9,092,382 B2 | 7/2015 | Deutschle et al. |
| 9,311,239 B2 | 4/2016 | Cooray et al. |
| 9,542,332 B2 | 1/2017 | Eddy |

(Continued)

OTHER PUBLICATIONS

Jacobi et al., "Cache Structure Using a Logical Directory," U.S. Appl. No. 15/625,223, filed Jun. 16, 2017.

(Continued)

*Primary Examiner* — Yong J Choe
(74) *Attorney, Agent, or Firm* — Nathan M. Rau

(57) ABSTRACT

The present disclosure relates to a method of operating a translation lookaside buffer (TLB) arrangement for a processor supporting virtual addressing, wherein multiple translation engines are used to perform translations on request of one of a plurality of dedicated processor units. The method comprises: maintaining by a cache unit a dependency matrix for the engines to track for each processing unit if an engine is assigned to the each processing unit for a table walk. The cache unit may block a processing unit from allocating an engine to a translation request when the engine is already assigned to the processing unit in the dependency matrix.

12 Claims, 3 Drawing Sheets

(56) References Cited

U.S. PATENT DOCUMENTS

| | | |
|---|---|---|
| 2011/0107057 A1 | 5/2011 | Petolino, Jr. |
| 2013/0103923 A1 | 4/2013 | Pan |
| 2013/0311415 A1 | 11/2013 | Nishitani et al. |
| 2014/0052955 A1 | 2/2014 | Moll et al. |
| 2016/0342524 A1 | 11/2016 | Eddy |
| 2016/0350234 A1* | 12/2016 | Podaima ............. G06F 12/1063 |
| 2017/0010977 A1 | 1/2017 | Avudaiyappan et al. |

OTHER PUBLICATIONS

Arpaci-Dusseau et al., "Paging: Faster Translations (TLBs)," Chapter 19, Operating Systems: Three Easy Pieces, 2014, pp. 1-17, Version 0.91, http://pages.cs.wisc.edu/~remzi/OSTEP/vm-tlbs.pdf.

Jaspers et al., "Method and Apparatus for an Efficient TLB Lookup," U.S. Appl. No. 15/650,365, filed Jul. 14, 2017.

List of IBM Patents or Patent Applications Treated as Related, Signed Dec. 15, 2017, 2 pages.

* cited by examiner

METHOD AND APPARATUS FOR AN EFFICIENT TLB LOOKUP

BACKGROUND

The present disclosure relates to the field of digital computer systems, and more specifically, to a method for operating a translation lookaside buffer.

Recent microprocessor architecture allows software to use so-called "virtual" (or sometimes called "logical") addresses to reference memory locations. The memory access itself is done using a "physical" (or sometimes called "absolute") address. To translate between the two, typically a data structure called Translation Lookaside Buffer (TLB) is involved. The process of translating is sometimes called Dynamic Address Translation (DAT), in particular in the IBM z/Architecture. There is a continuous need of improving address translation process using the TLBs.

SUMMARY

Various embodiments provide a method for operating a translation lookaside buffer, apparatus and computer program product as described by the subject matter of the independent claims. Advantageous embodiments are described in the dependent claims. Embodiments of the present disclosure can be freely combined with each other if they are not mutually exclusive.

In one aspect, the disclosure relates to a method of operating a translation lookaside buffer (TLB) arrangement (e.g. for an address translation mechanism using multiple parallel translation engines) for a processor supporting virtual addressing, wherein multiple translation engines are used to perform translations on request of one of a plurality of dedicated processor units. The method comprises maintaining by a cache unit a dependency matrix for the engines to track for each processing unit if an engine is assigned to each processing unit for a table walk. The method further, blocks by the cache unit a processing unit from allocating an engine to a translation request when the engine is already assigned to the processing unit in the dependency matrix.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to an apparatus of operating a translation lookaside buffer (TLB) arrangement (e.g. for an address translation mechanism using multiple parallel translation engines) for a processor supporting virtual addressing, wherein multiple translation engines are used to perform translations on request of one of a plurality of dedicated processor units. The apparatus is configured to maintain, by a cache unit, a dependency matrix for the engines to track for each processing unit if an engine is assigned to the each processing unit for a table walk. It further is configured to block by the cache unit a processing unit from allocating an engine to a translation request when the engine is already assigned to the processing unit in the dependency matrix. For example, the translation request is a retry request for a given initial translation request, wherein the engine is assigned for the initial request upon detecting a cache miss (e.g. TLB2 miss as described below).

BRIEF DESCRIPTION OF THE DRAWINGS

In the following embodiments of the disclosure are explained in greater detail, by way of example only, making reference to the drawings in which.

DETAILED DESCRIPTION

Figure 1:
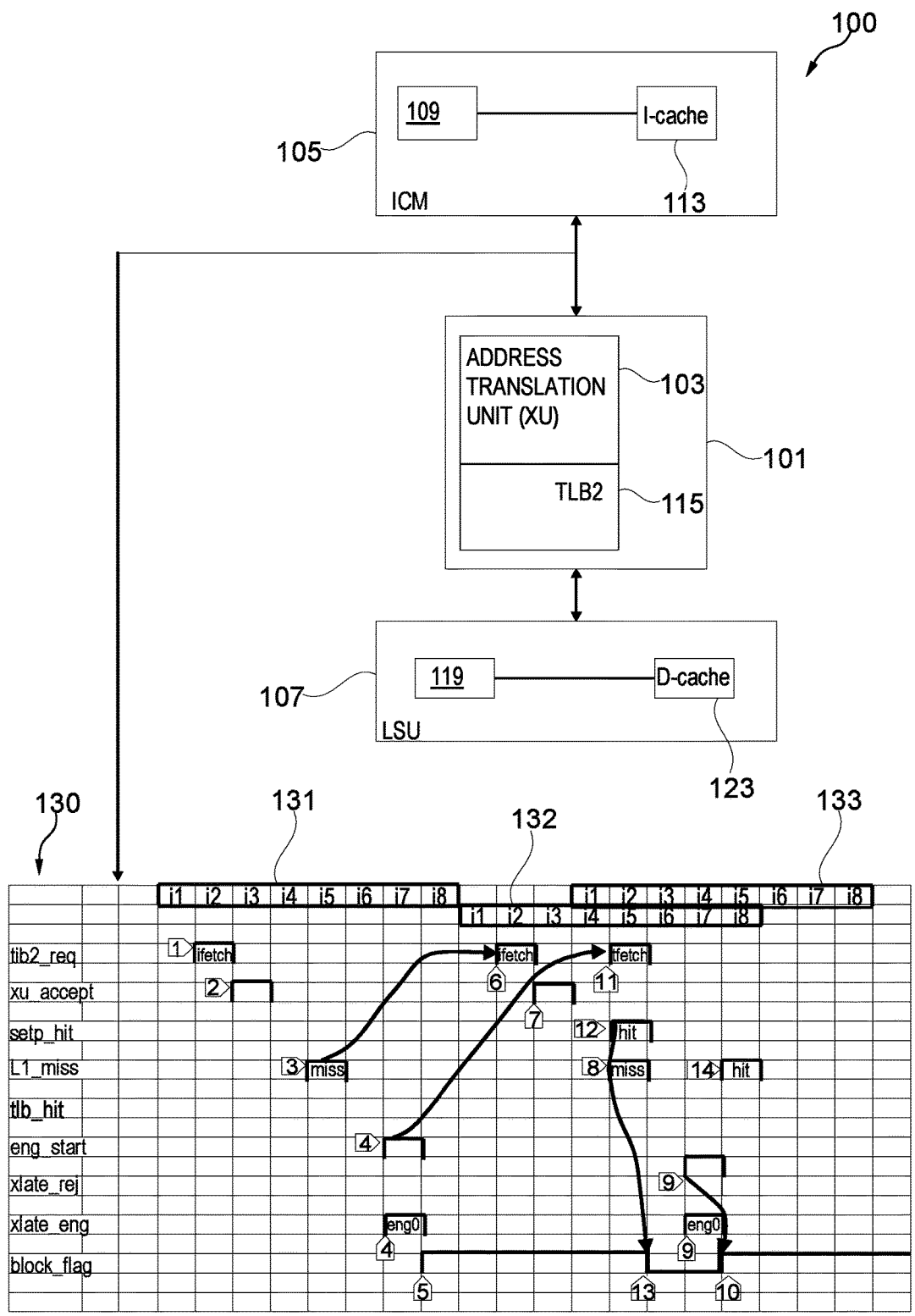
FIG. 1 illustrates a data processing system in accordance with an example of the present disclosure.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

For example, the TLB may be a set-associative TLB.

Page translation, i.e., translation of the virtual page address to the physical page address, is accomplished by a so-called page table walk. The operating system maintains tables that contain information for translating the virtual page address to a physical page address. These tables reside in system memory. Hence, it is a relatively costly operation to perform a page table walk. The page table walk may be performed by hardware, software, or a combination thereof.

The present method may enable improving performance in term of processing time in all the cases of TLB lookup. By blocking the processing unit, the present method may ensure that the processing unit does not return a busy indicator for the translation request. The translation request (second lookup) may be triggered by a cache miss of a previous translation request (first lookup) referring to the same address to be translated. The translation request is a retry of the first lookup.

Since the second lookup does not return any busy flag and the dependency from the first lookup is not there, one more retry of the instruction fetch may happen immediately (without waiting for the explicit restart indication from the processing unit). This lookup may have a TLB hit because the processing unit has got enough time to process the table walk.

According to one embodiment, the blocking comprises sending a signal to the processing unit indicating that the engine is not to be allocated e.g. not to be allocated for a further retry request since there is already an engine working on the original request. This may enable a systematic method that can be easily implemented on a hardware component.

According to one embodiment, the TLB arrangement comprises at least two translation lookaside buffers of which a first one (TLB1) is a first level buffer maintained by the cache unit and a second one (TLB2) is a second level translation lookaside buffer arranged to feed said first one with address information in case of a missing address of the first one and maintained by the processing unit, wherein the translation request is executed (e.g. in parallel) on the first level TLB and on the second level TLB, wherein in response to a TLB miss in the first level TLB the method comprises initiating by the cache unit a further translation request. For example, the translation request is a retry translation request that is generated in response to a previous translation request that resulted in a TLB1 miss in TLB1. A first level cache may be associated with TLB1 and a second level cache may be associated with TLB2. The first level cache may be absolute (address) tagged. For example, the TLB1 may be optional and the TLB2 may be used for address translation for accessing a second level cache. The first level cache may for example be logically indexed. This embodiment may further speed up the translation process by a TLB level and by performing retrying requests in a time window (upon detecting the level 1 cache miss) that enable further speeding up the execution process.

According to one embodiment, the blocking comprises preventing the processing unit from sending an engine busy indication for a further retry request that would prevent the cache unit from sending the further translation request for the same translation.

For example, a first (L1) and a second level (L2) cache may be provided. The first level cache may for example be logically indexed. According to one embodiment, the translation request is generated in response to a previous translation request that resulted in a miss in the first level cache. This may for example save processing resources in case of a level 1 cache hit (or first level cache hit) of the translation request. In another example, the translation request is executed on the TLB2 in parallel to executing the lookup in level 1 cache. This may be advantageous in case of a level 1 cache miss, as the process of TLB2 (or even the address translation itself if there is a TLB2 miss) is already started and thus the time may be saved.

According to one embodiment, the blocking is performed on a pipeline cycle before the assignment of the engine occurs. This embodiment may seamlessly be integrated in existing pipeline processing systems.

According to one embodiment, the method further comprises updating the dependency matrix upon receiving one of: an indication of an engine being assigned by a processing unit; receiving a restart signal from the processing unit indicating that the engine is not busy. This may prevent having an outdated matrix that may cause delays e.g. in case of an engine that is noted as being busy although it is not busy and thus extra unnecessary signals are generated.

In one example, the translation request is a new second request (e.g. for a new address). In this example, the method may further comprise: upon detecting a L1 cache hit for a retry request of a first translation request, enabling by the cache unit the processing unit for allocating an engine to the second translation request when the engine is already assigned to the processing unit in the dependency matrix by updating the dependency matrix and sending a rescind request to the processing.

According to one embodiment, the execution of the translation request is divided into multiple execution steps, wherein one of the execution steps comprises the assignment of an engine, each execution step is occurring on a respective clock cycle, wherein the blocking is performed on a clock cycle before the clock cycle on which the assignment of the engine occurs. This embodiment may seamlessly be integrated in existing pipeline processing systems.

According to one embodiment, the execution of the multiple steps is performed in a pipelined structure.

According to one embodiment, the assigning of the engine as a table walk engine is performed in response to a TLB miss detection in the second level TLB.

According to one embodiment, the maintaining further comprises: creating a retry blocking flag in association with the translation request, wherein the retry blocking flag is set to a value indicating that the engine assigned to the translation request is busy or not busy, wherein the cache unit is configured to trigger a retry translation request of the translation request in case the flag is set to a value indicating that the engine is not busy.

FIG. 1 illustrates an exemplary data processing system 100. The data processing system 100 may for example be part of a processor core supporting virtual addressing. The system 100 comprises a management unit 101. The management unit 101 comprises an address translation unit XU 103. The XU 103 translates requests containing a virtual address (VA) into translation-results containing an absolute address (AA) using a second level TLB (TLB2) 115. The TLB2 may for example be used for address translation for a second level cache.

The management unit 101 is configured to operate with an instruction cache and merge (ICM) unit 105 as well as with a load and store unit (LSU) 107. The ICM 105 comprises an instruction cache controller (ICM controller) 109 (and optionally a first level instruction TLB) and an instruction cache 113. The LSU 107 comprises a data cache controller (LSU controller) 119 (and optionally a first level data TLB) and a data cache 123. The XU may comprise one or more table walk engines (not shown) for performing a table walk operation in response to a TLB2 miss. The table walk operation may comprise obtaining virtual to physical address translations which would enable the TLB to be reloaded from the page frame table in memory. I-cache 113 and D-cache 123 may for example be logically indexed.

The ICM 105 prompts the address translation unit 103 for a required address translation.

For example, the ICM controller 109 (LSU controller 119) may be configured to lookup the I-cache 113 (D-cache 123) for a virtual address. If the address missed the first level instruction or data cache 105 and 107 a TLB2 lookup may be performed by sending corresponding virtual address to the translation unit 103. The translation unit 103 immediately starts the translation process using TLB2 115 for the obtaining the required physical address. In another example, a lookup of the first level cache 105 and 107 may be performed in parallel to the TLB2 lookup.

In case of a TLB2 hit, the translation stops. In case of a TLB2 miss, translation unit 103 may engage or allocate one table walk engine of a predefined number of the table walk engines to perform the logical to absolute translation e.g. to perform a table walk using the first level cache, second level cache and main memory. At the end of the translation process, result data may for example be stored in TLB2 and level 1 cache.

The process of address translation that is performed between the ICM 105 and the translation unit 103 is described with reference to diagram 130. What is described herein with reference to ICM 105 may be implemented for LSU 107. The diagram 130 shows instruction pipelines 131-133 for address translation execution. The instruction pipeline 131 is for a first translation request (referred to also as first TLB2 lookup) that starts with instruction fetch at i2 of the pipeline 131. The instruction pipeline 132 is for the retry translation request (referred to as second TLB2 lookup) that starts with instruction fetch at i2 of the pipeline 132. The retry translation request is triggered by an execution step of the first translation request of the pipeline 131. The pipeline 133 is for the execution of the table walk that starts with table fetch (tfetch) instruction at i2 of the pipeline 133.

As illustrated on the diagram 130, ICM 105 sends out a first TLB2 lookup request to XU 103 at i2 pipeline stage (step 1) of pipeline 131. Pipeline 131 is associated with the first TLB2 lookup. XU 103 arbitrates (step 2) the request from ICM 105 and performs a TLB2 lookup for the winning request. In i7 of the pipeline 131, XU 103 indicates ICM 105 whether it is a TLB2 hit or a miss and if it is a miss whether XU 103 can assign or allocate an engine for the translation. Some of the cases XU 103 may be able to assign an engine immediately if the engine is available for performing a page table walk. In certain cases, all the engines could be busy or there could be a dependency on one of the engines to perform the translation and that engine is busy. All such status are indicated in a status information sent by XU 103 to ICM 105 in i7 stage. Based on this status information, the ICM 105 may set a flag block_flag associated with the first translation request. If for example, the status information indicates that all engines are busy, the flag may be set such that further retry translation requests may not be triggered. A further retry translation request may be triggered by an execution step of the retry translation request (of pipeline 132).

In i5 stage of pipeline 131 a level 1 cache hit/miss indication may be determined. So for improving performance, if a level 1 cache miss is determined in i5, a retry of the request is scheduled in i5 of the pipeline 131 itself (i5 of the pipeline 131 is i−3 of pipeline 132 that corresponds to the retry request) without waiting until i7 for the XU status. This may ensure that if there is a TLB2 hit for the first TLB2 lookup, a fastest level 1 cache hit may be found with the retry translation request (second TLB2 lookup). If there is a busy status or engine assignment for the first translation request, it is updated in ICM 105 and this may block further retries until the engine status is cleared. If there is an engine assigned for translation or if there is an engine busy indication, ICM 105 has to wait until the translation is done or the engine busy is gone away. XU 103 informs ICM 105 about the freeing up of engine though a restart interface.

The steps 1-13 may be summarized as follows:

Step 1) A TLB2 lookup request (of a first request) for a new fetch instruction (ifetch). The diagram illustrates a translation request (initiated by the new fetch instruction) and its retry translation requests.

Step 2) XU 103 accepts the lookup request.

Step 3) The level 1 cache lookup resulted in a miss

Step 4) The TLB2 lookup of step 1) misses the TLB2 in XU 103 and it assigns an engine Eng0 to perform the address translation (table walk).

Step 5) A flag in ICM 105 is set to indicate that the ifetch need not try again until XU 103 resolves the TLB2 translation using engine Eng0. But a retry (of step 6) has already initiated before this at i5 of the first request when it missed the TLB1 (i5 of first request=i−3 of the retry).

Step 6) a TLB2 lookup is retried since the first one missed level 1 cache. Step 3) initiated this retry.

Step 7) XU 103 accepts the retried request.

Step 8) It is a level 1 cache miss as expected.

Step 11) The engine assigned in step 4) sends out a table fetch request and ICM 105 starts a lookup on that.

Step 12) The table fetch lookup (of step 11) hits the I-cache 113. Setp_hit refers to a prediction (or predicts) that the table fetch lookup may hit the I-cache 113. Step 14) indicates that the hit occurred in the I-cache 113.

Step 13) Since XU 103 needed only one table fetch to resolve the address translation, XU indicated ICM through a restart hint. The restart hint indicates that if the table fetch hits I-cache 113, allocated engine Eng0 can be restarted. So ICM 105 is clearing the busy flag for ifetch.

Step 9) Since engine Eng0 is already assigned to resolve this address translation and that engine is still busy in translation, XU responds with an engine busy indication.

Step 10) step 9) causes ICM 105 to set the busy flag back which will block further retries of the same ifetch of i2 of pipeline 131.

Now ICM 105 needs to wait until XU 103 sends an explicit restart signal for engine Eng0 to clear the busy flag and restart ifetches.

Figure 2:
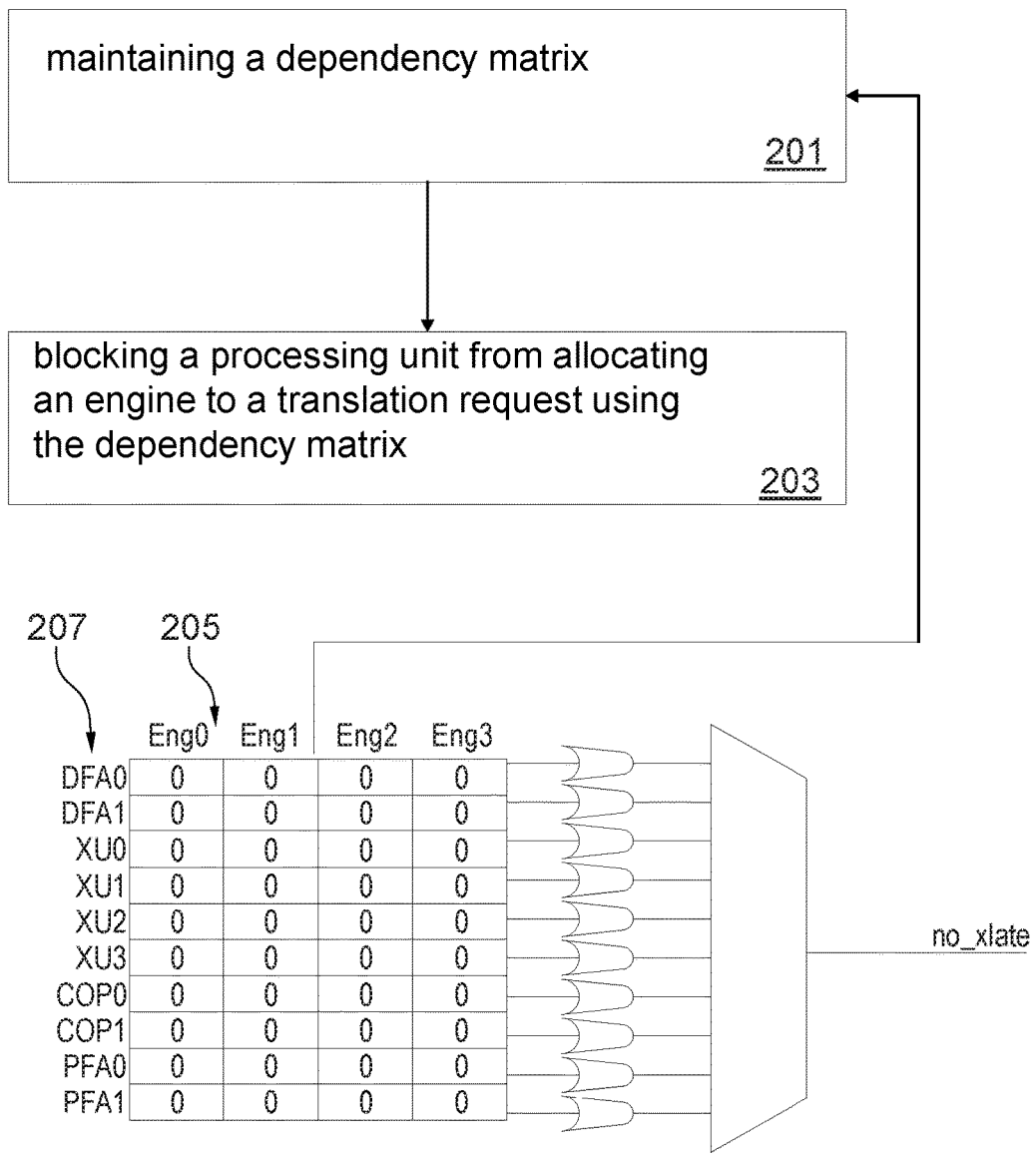
FIG. 2 is a flowchart of a method for operating a translation lookaside buffer arrangement.

FIG. 2 is a flowchart of a method for controlling address translation using a TLB arrangement as the one described with reference to FIG. 1. Address translation requests may be originated from various components (e.g. requestors) of the present system. An engine may be assigned by the processing unit for a given virtual address e.g. the table walks needed for the translation request or retry translation requests referring to that same virtual address may be assigned to the same engine.

In step 201, a dependency matrix (or engine dependency matrix) 205 may be maintaining by a cache unit such as the ICM 105 or LSU 107. The dependency matrix 205 shown in FIG. 2 comprises columns Eng0-3 for respective engines to track for each processing unit ore requestor 207 if an engine is assigned to it for performing a table walk. For example, if engine Eng0 is assigned or allocated for performing a table walk for a translation request that has been requested or triggered by the processing unit DFA0, the value of the corresponding cell in the matrix 205 may be set 1 otherwise it may be set to 0. DFA0 (DFA1) refers to an instruction fetch (ifetch) requestor associated with a thread 0. XU0-3 refers to a table fetch instruction (tfetch) requestor associated with respective table walk engines numbered from 0 to 3. PFA0-1 refers to a prefetching instruction requestor e.g. associated with fetch units 0 and 1 respectively. COP may refer to a co-processing unit.

The dependency matrix 205 may be used to track engine status for each of the requestors 207. Since there are 4 engines, as exemplified in FIG. 2, each of the requestors needs 4 bit in the matrix (one bit per engine). When an engine is assigned or if the request has a dependency with the current translation, the corresponding bit in the matrix is set for that requestor.

For example, each requestor of the requestors 207 may assign one engine at a time in that the requestor may assign the engine for address translation (e.g. of virtual address X) and waits until the translation is done such that it can assign an engine for a further translation request. For example, at a given time the row associated with a given requestor may comprise one bit having value 1 and other bits having value 0, since the requestor is still at that given time waiting for the translation to complete by and receive results via the engine associated with the bit having value 1. As illustrated in FIG. 2, for each row of the matrix 205 a bit may be output indicting the OR of the 4 bits of the row. At the multiplexer one of the output bits may be selected based on the requestor which is input to the multiplexer.

For example, the status information that is sent by the processing unit (e.g. XU 103) to the cache unit may comprise a 4-bit engine dependency vector that is passed to cache unit through the interface. For both the cases, starting of translate and rejection, cache unit updates the engine dependency matrix with the information provided by processing unit. The cache unit uses the dependency of the requestor and the level cache hit information of the translation request for indicating translator to free up the engine.

For example, if engine Eng1 is assigned for a translation request originated from requestor DFA0 (associated with thread0), processing unit (XU 103) passes that info to cache unit and cache unit updates the matrix 205 as follows: the bit corresponding to Eng1 is set to 1 for requestor DFA0. This bit may be reset when a restart/done message is received for at the cache unit for engine Eng1. For example, as long as any of the bit is high for a requestor, that requestor may be blocked from putting a new request.

In step 203, the cache unit may block a processing unit from allocating an engine of the plurality of engines to a translation request when that engine is already assigned to the processing unit in the dependency matrix 205 (e.g. the blocking is performed if at least one of the 4 bits associated with the "processing unit" is set to 1). For example, the cache unit may send a signal (referred to as no_xlate) to the processing unit indicating that the engine is not to be allocated by the processing unit.

The translation request of step 203 may be a retry translation request of a previous translation request that has a first level cache miss (I-cache miss or D-cache miss).

For example, FIG. 2 shows the logic for performing step 203. The logic is for detecting the situation where a no_xlate needs to be sent and it is based on the state of the matrix 205. If there is at least one bit set for that particular requestor (the processing unit to be blocked), which indicates that a previous request is in process, ICM 105 may send a no_x-late. The detection logic is to logically OR the engine bits per requestor and select the right one based on the requestor. For example, the matrix 205 may be associated with a given address to be translated, where such translation may trigger multiple retry requests.

Figure 3:
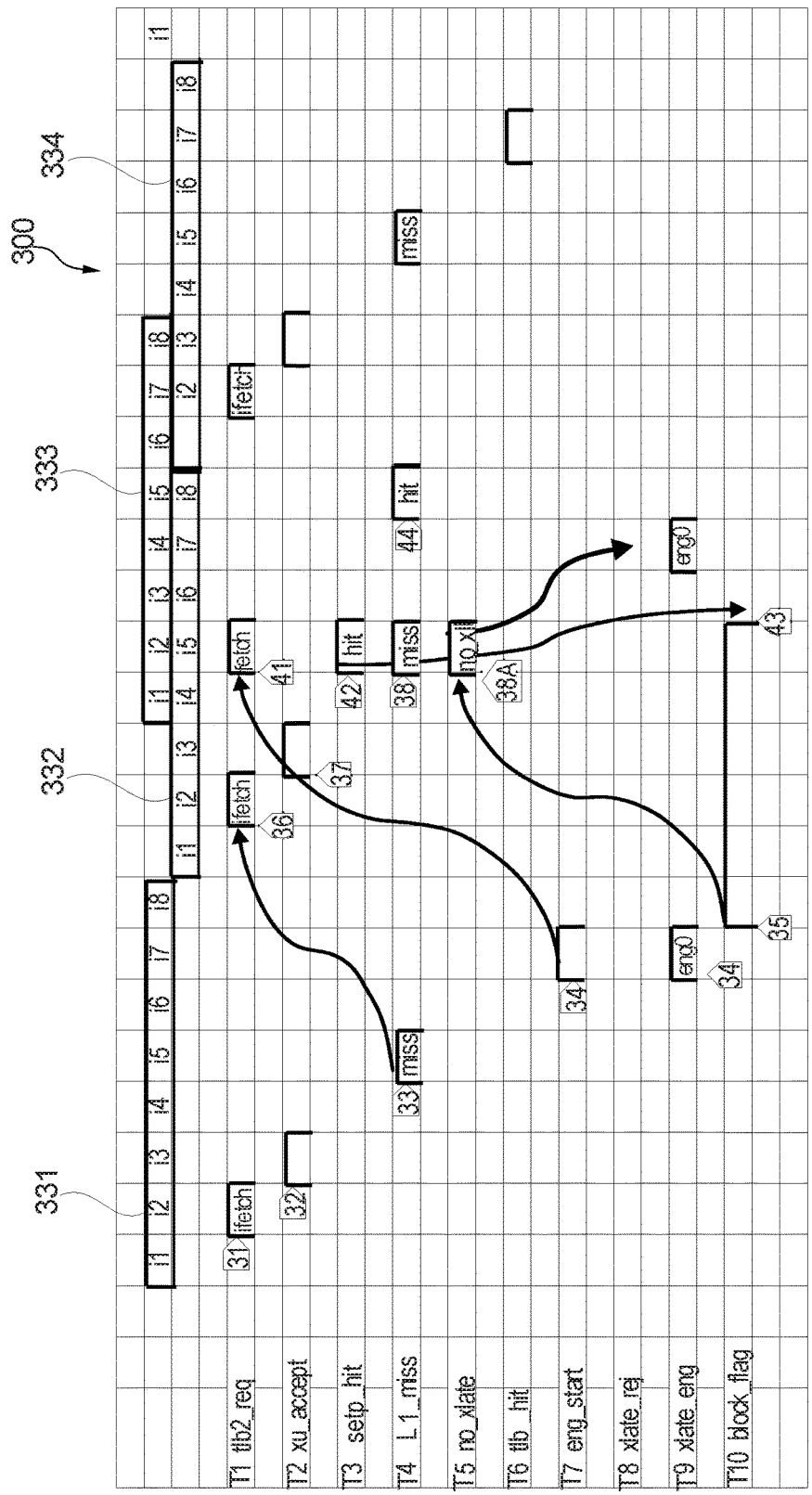
FIG. 3 is a diagram an example process of address translation that is performed in the data processing system.

FIG. 3 is a diagram 300 for another process of address translation that is performed between the ICM 105 and the translation unit 103 in accordance with the method of FIG. 2. What is described herein with reference ICM 105 may be implemented for LSU 107.

The diagram 300 shows instruction pipelines 331-333 for address translation execution. The instruction pipeline 331 is for a first translation request (referred to also as first TLB2 lookup) that starts with instruction fetch at i2 of the pipeline 331. The instruction pipeline 332 is for the retry translation request (referred to as second TLB2 lookup) that starts with instruction fetch at i2 of the pipeline 332. The retry translation request is triggered by an execution step of the first translation request of the pipeline 331. The pipeline 333 is for the execution of the table walk that starts with table fetch (tfetch) instruction at i2 of the pipeline 333. The translation request of step 203 may be the retry translation request (second TLB2 lookup).

The pipelines 331 and 332 involve the execution steps T1, T2, T4-T10. The pipeline 333 involves execution steps T1, T3 and T10. The first (second) translation request involves the translation in TLB2 and access in the first level cache and in case of a level 1 miss a retry request is triggered if the flag block_flag is not set. The flag may be set based on the content of the dependency matrix described with reference to FIG. 2. For example, a flag may be associated at the ICM 105 to the first translation request. In case of a TLB2 miss, an engine is allocated or assigned for performing a table walk following the pipeline 333.

The steps of the translation process of FIG. 3 may be described as follows.

Step 31) A first TLB2 lookup request (first translation request) for a new ifetch is performed. The first TLB2 lookup request may be triggered by a given translation requestor.

Step 32) XU 103 accepts the lookup request of step 31).

Step 33) The I-cache lookup (first level cache lookup) resulted in a cache miss.

Step 34) The first TLB2 lookup of step 31) misses the TLB2 in XU 103 and an engine Eng0 is assigned or allocated to perform the address translation (table walk).

Step 35) A flag (block_flag) in ICM 105 is set to indicate that the ifetch needs not try again until XU 103 resolves the TLB2 translation using engine Eng0. But a retry (step 36) has already initiated before this at i5 of the first TLB2 lookup when it missed the I-cache (i5 of first request=i-3 of retry). At i5 of the pipeline 331 the flag was not yet set. Step 35 may further comprise updating the dependency matrix bits associated with the given requestor.

Step 36) the first TLB2 lookup is retried since the first one missed I-TLB1. Step 33) initiated this retry. The retried first TLB2 lookup is the second TLB2 lookup.

Step 37) XU 103 accepts the second TLB2 lookup.

Step 38) I-cache miss (first level cache miss) is detected as expected for the second TLB2 lookup.

Step 38A) Since the block_flag is already set, ICM 105 sends out a no_xlate signal to XU 103. This stops XU 103 from trying a new engine allocation. This would also stop the XU 103 from sending a status information indicating a busy status that would reset the flag as in step 10) of FIG. 1 (steps 9 and 10 of FIG. 1 are avoided).

Step 41) The engine assigned in step 34) sends out a table fetch request and ICM 105 starts a lookup on that.

Step 42) The table fetch lookup of step 41) hits the I-cache 113. "setp_hit" refers to a prediction (or predicts) that the table fetch lookup may hit the I-cache 113. Step 44) indicates that the hit occurred in the I-cache 113.

Step 43) Since XU 103 needed only one table fetch to resolve the address translation, XU 103 indicated ICM 105 through the restart hint that if the table fetch hits I-cache 113, engine Eng0 can be restarted. So ICM 105 is clearing the busy flag for ifetch. Compared to diagram 130 the flag is not reset again because the XU 103 received already in step 38A) the no-xlate request. With the no-xlate request XU 103 does not try a new engine allocation which may result in busy signal submission to the ICM 105.

In the diagram 300 ICM is informing XU though no_xlate (step 38A) signal in i5 that it need not try to assign an engine for translation, but indicate only if it a TLB2 hit. For the retry, an engine is already known to be assigned to the original request and so ICM can tell XU not to try for an engine assignment. So since XU doesn't give any busy indication for the retried request, block_flag is not set again. This may enable ICM 105 to perform a further retry of the second TLB2 lookup as indicated by ifetch under i2 of pipeline 334. The pipeline 334 may be associated with a third TLB2 lookup which is a retry of the second TLB2 lookup. This may further improve performance of the processor.

Thus by contrast to diagram 130, the present diagram 300 may further improve performances in particular for the case where there is a TLB2 hit for the first TLB2 lookup.

In another example, the dependency matrix used in this case. When a TLB2 lookup indicates a miss, a translation engine can get assigned to perform the translation. This translation can take hundreds of cycles to complete and till then the engine will be occupied. In some cases, though the first lookup is an L1 cache miss, the retry of the same lookup can result into an L1 cache hit due to log directory updates. Here, translation performed by the engine will get unused since we already got the data from L1 cache. In such scenarios, this example method helps freeing up the engine before the translation is completed thereby making it available to other translation requests. For example, this example method may be described using the pipelines 331 and 332:

S1. A TLB2 lookup request for a new ifetch (Req1) may be performed at i2 of pipeline 331; S2. XU accepts the lookup request at i3 of pipeline 331; S3. The L1 cache lookup resulted in a miss at i5 of pipeline 331; S4. The TLB2 lookup in (S1) misses the TLB2 in XU and it assigns Eng0 at i7 of pipeline 331 to perform the address translation; S5. Req1 engine dependency matrix is updated at i8 of pipeline 331 so that the Req1 is not retried until eng0 is restarted; S6. The TLB2 lookup is retried at i2 of pipeline 332 since the first one missed L1. S3 initiated this retry; S7. The second lookup hits the L1setp (setp_hit) at i2 of pipeline 332; S8. And at i5 of pipeline 332, the second lookup gets an L1 hit too; S9. This L1 hit causes to clear the engine dependency matrix for eng0; S10. An engine rescind is sent for engine0 to translator unit (e.g. XU) at i6 of pipeline 332. On receiving by the XU the rescind the designated engine may be freed up and made available for another translation request. By clearing the engine and stopping the unwanted translation, the engine may be available for another translation (otherwise the engine may be busy for hundreds of cycles with the translation) and also all the table read requests may be saved (e.g. if the tables are not cached in translator unit (XU), it needs to be read from the system memory). The present method may be advantageous e.g. more effective for a Guest-2 translation. For a Guest-2 translation, there could be once more underlying translation where two engines could get engaged. Here the translation may take many cycles and many more table read requests. So if for a Guest-2 translation, an engine is assigned and the next lookup results in an L2 cache hit (L1 cache hit), the present method may further improve the performance.

For example a retry of a TLB2 lookup may be performed until translation unit (e.g. XU) returns a dependency. This dependency could be a blockage or an engine assignment for performing a translation. An update of a logdir of L1 cache unit and an auto correct of setp structure of L1 cache may be performed. Update of the dependency matrix may be performed for the requestor with the latest values from translator unit like the engine assigned for translation. The process of the retry of the lookup and detection whether there is an L1 cache hit may be performed. If there is an L1 cache hit for the second try, the translator unit may be informed to rescind the engine. On receiving the indication from L1 cache unit, the designated engine may be freed up and made available for another translation request.

In one example, a method of operating a translation lookaside buffer for a processor supporting virtual addressing is provided, wherein multiple translation engines are used to concurrently perform translations on request of one of a plurality of dedicated processor units, the method further comprising: —maintaining a dependency matrix for the engines to track for each requestor if an engine is assigned to it; —rejecting a translation request for an engine from a processor unit when the engine is already assigned to a different unit in the dependency matrix.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating a translation lookaside buffer (TLB) arrangement for a processor supporting virtual addressing, wherein multiple translation engines are used to perform translations on request of one of a plurality of dedicated processor units, the method comprising:
   maintaining by a cache unit a dependency matrix for the multiple translation engines to track for each processing unit if an engine of the multiple translation engines is assigned to each processing unit for a table walk;
   blocking by the cache unit a processing unit from allocating an engine from the multiple translation engines to a translation request when that engine is already assigned to a processing unit in the dependency matrix;
   updating the dependency matrix upon receiving one of: an indication of the engine being assigned the processing unit; and
   receiving a restart signal from the processing unit indicating that the engine is not busy.

2. The method of claim 1, wherein blocking comprises sending a signal to the processing unit indicating that the engine is not to be allocated.

3. The method of claim 1, wherein the TLB arrangement comprises at least two translation lookaside buffers of which a first one (TLB1) is a first level buffer maintained by the cache unit and a second one (TLB2) is a second level translation lookaside buffer arranged to feed said first one with address information in case of a missing address of the first one and maintained by the processing unit, wherein the translation request is executed on the first level TLB1 and on the second level TLB2, wherein in response to a TLB miss in the first level TLB1 the method comprises initiating by the cache unit a further translation request.

4. The method of claim 3, wherein blocking comprises preventing the processing unit from sending an engine busy indication that would prevent the cache unit from sending the further translation request.

5. The method of claim 3, wherein assigning of the engine as a table walk engine is performed in response to a TLB miss detection in the second level TLB2.

6. The method of claim 1, wherein a first and second level caches are provided, and wherein the translation request is a retry translation request that is generated in response to a previous translation request that resulted in a miss in the first level cache.

7. The method of claim 1, wherein blocking is performed on a pipeline cycle before the assignment of the multiple translation engine occurs.

8. The method of claim 1, wherein the execution of the translation request is divided into multiple execution steps, wherein one of the execution steps comprises the assignment of an engine, wherein each execution step is occurring on a respective clock cycle, and wherein blocking is performed on a clock cycle before the clock cycle on which the assignment of the engine occurs.

9. The method of claim 8, wherein the execution of the multiple steps is performed in a pipelined structure.

10. The method of claim 1, wherein the cache unit is an instruction or data cache unit.

11. The method of claim 1, wherein maintaining further comprises:
   creating a retry blocking flag in association with the translation request, wherein the retry blocking flag is set to a value indicating that the engine assigned to the translation request is busy or not busy, and wherein the cache unit is configured to trigger a retry translation request of the translation request in case the flag is set to a value indicating that the engine is not busy.

12. The method of claim 1, wherein a first (L1) and second (L2) level caches are provided, wherein upon detecting a L1 cache hit for a retry request of a first translation request, further comprising:
   enabling by the cache unit the processing unit for allocating an engine to a second translation request when the engine is already assigned to the processing unit and the first translation request in the dependency matrix by updating the dependency matrix and sending a rescind request to the processing.

\* \* \* \* \*